United States Patent
Ji et al.

(10) Patent No.: US 11,108,493 B2
(45) Date of Patent: *Aug. 31, 2021

(54) DEVICES AND METHODS FOR FACILITATING A NON-ORTHOGONAL UNDERLAY IN WIRELESS COMMUNICATIONS SYSTEMS

(71) Applicant: QUALCOMM Incorporated, San Diego, CA (US)

(72) Inventors: Tingfang Ji, San Diego, CA (US); John Edward Smee, San Diego, CA (US); Joseph Binamira Soriaga, San Diego, CA (US); Naga Bhushan, San Diego, CA (US); Wei Zeng, Saratoga, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/521,465

(22) Filed: Jul. 24, 2019

(65) Prior Publication Data

US 2019/0349117 A1 Nov. 14, 2019

Related U.S. Application Data

(63) Continuation of application No. 14/856,491, filed on Sep. 16, 2015, now Pat. No. 10,389,477.
(Continued)

(51) Int. Cl.
*H04L 1/00* (2006.01)
*H04B 1/7107* (2011.01)
(Continued)

(52) U.S. Cl.
CPC .......... *H04L 1/0009* (2013.01); *H04B 1/7107* (2013.01); *H04L 27/2601* (2013.01); *H04W 72/0446* (2013.01); *H04B 2201/70701* (2013.01)

(58) Field of Classification Search
CPC . H04L 1/0009; H04L 27/2601; H04B 1/7107; H04B 2201/70701; H04W 72/0446
See application file for complete search history.

(56) References Cited

U.S. PATENT DOCUMENTS

| 6,157,847 A | 12/2000 | Buehrer et al. |
| 7,042,856 B2 | 5/2006 | Walton et al. |

(Continued)

FOREIGN PATENT DOCUMENTS

| CN | 1405984 A | 3/2003 |
| CN | 101558611 A | 10/2009 |

(Continued)

OTHER PUBLICATIONS

Taiwan Search Report—TW105105681—TIPO—dated Sep. 20, 2019 (152556TW).
(Continued)

*Primary Examiner* — Melvin C Marcelo
(74) *Attorney, Agent, or Firm* — Qualcomm IP Dept.; James Hunt Yancey, Jr.

(57) ABSTRACT

Wireless communication devices are adapted to facilitate non-orthogonal underlay transmissions. In one example, devices can receive a wireless transmission on a particular time and frequency resource including a first signal from a first wireless device and a second signal from a second wireless device. The first signal may utilize a first type of modulation for orthogonal wireless communication, and the second signal may utilize a second type of modulation non-orthogonal to the first type of modulation. The wireless
(Continued)

communication device can decode the first and second signals. In another example, devices may transmit a first signal utilizing a first type of modulation over a time and frequency resource scheduled for a second signal from a second wireless communication device, the second signal utilizing a second type of modulation for orthogonal wireless communication, where the first type of modulation is non-orthogonal with the second type of modulation. Other aspects, embodiments, and features are also included.

21 Claims, 6 Drawing Sheets

Related U.S. Application Data (60) Provisional application No. 62/133,388, filed on Mar. 15, 2015.

(51) Int. Cl.
 H04L 27/26 (2006.01)
 H04W 72/04 (2009.01)

(56) References Cited

U.S. PATENT DOCUMENTS

| 7,852,746 | B2 | 12/2010 | Jalali |
| 8,050,236 | B1 | 11/2011 | Mansour |
| 8,559,948 | B2 | 10/2013 | Chin et al. |
| 8,831,156 | B2 | 9/2014 | Liang et al. |
| 9,178,640 | B2 | 11/2015 | Bhattad et al. |
| 9,749,819 | B2 | 8/2017 | Sun et al. |
| 2005/0238108 | A1 | 10/2005 | Suh et al. |
| 2007/0223359 | A1 | 9/2007 | Li et al. |
| 2008/0232240 | A1 | 9/2008 | Baum et al. |
| 2009/0074098 | A1* | 3/2009 | Wu ............... H04L 5/026 375/260 |
| 2009/0316647 | A1 | 12/2009 | Chen et al. |
| 2010/0002754 | A1 | 1/2010 | Lee et al. |
| 2011/0103509 | A1 | 5/2011 | Chen et al. |
| 2014/0024388 | A1 | 1/2014 | Earnshaw et al. |
| 2014/0029562 | A1 | 1/2014 | Kishiyama |
| 2014/0050279 | A1 | 2/2014 | Kishiyama |
| 2016/0191175 | A1 | 6/2016 | Hwang et al. |
| 2016/0269145 | A1 | 9/2016 | Ji et al. |

FOREIGN PATENT DOCUMENTS

| CN | 102891821 A | 1/2013 |
| CN | 103493380 A | 1/2014 |
| JP | H09233047 A | 9/1997 |
| KR | 20100087207 A | 8/2010 |
| KR | 20120101106 A | 9/2012 |
| WO | 2002091597 | 11/2002 |
| WO | 2005015775 A1 | 2/2005 |
| WO | 2006026344 A1 | 3/2006 |
| WO | 2009140103 A1 | 11/2009 |
| WO | 2011063567 A1 | 6/2011 |

OTHER PUBLICATIONS

International Search Report and Written Opinion—PCT/US2016/020290—ISA/EPO—dated May 20, 2016 (152556WO).
Second Written Opinion from International Application No. PCT/US2016/020290, dated Jan. 30, 2017, 8 pp. (152556WO).

* cited by examiner

DEVICES AND METHODS FOR FACILITATING A NON-ORTHOGONAL UNDERLAY IN WIRELESS COMMUNICATIONS SYSTEMS

PRIORITY CLAIM

The present Application for Patent is a Continuation of Non-Provisional application Ser. No. 14/856,491, filed in the U.S. Patent and Trademark Office on Sep. 16, 2015, the entire content of which is incorporated herein by reference as if fully set forth below in its entirety and for all applicable purposes. Non-Provisional application Ser. No. 14/856,491 claims priority to, and the benefit of Provisional Application No. 62/133,388, filed in the U.S. Patent and Trademark Office on Mar. 15, 2015, the entire content of each of which is also incorporated herein by reference as if fully set forth below in its entirety and for all applicable purposes.

TECHNICAL FIELD

The technology discussed below relates generally to wireless communications, and more specifically to methods and devices for facilitating a non-orthogonal underlay.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of devices are adapted to utilize such wireless communications systems. These devices may be generally referred to as wireless communication devices and/or access terminals. As the demand for mobile broadband access continues to increase, research and development continue to advance wireless communication technologies not only to meet the growing demand for mobile broadband access, but to advance and enhance the user experience. In some instances, advances in the ability to share the available system resources among access terminals may be beneficial.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate non-orthogonal wireless underlay communications within a wireless communications system. According to at least one aspect of the disclosure, wireless communication devices are disclosed, which are adapted to facilitate non-orthogonal wireless underlay communications. In at least one example, wireless communication devices may include a receiver circuit adapted to receive a wireless transmission. The wireless transmission may include a first signal from a first wireless device on a particular time and frequency resource utilizing a first type of modulation for orthogonal wireless communication, and a second signal from a second wireless device on the particular time and frequency resource utilizing a second type of modulation that is non-orthogonal to the first type of modulation. A decoder may be coupled to the receiver circuit and adapted to obtain the wireless transmission, and to decode the first signal and the second signal.

In at least one other example, wireless communication devices may include an encoder configured to encode data for transmission employing a first type of modulation. A transmitter circuit may be coupled to the encoder, and may be configured to transmit the data as a first signal employing the first type of modulation. The first signal may be transmitted over at least a portion of a time and frequency resource scheduled for a second signal from a second wireless communication device, where the second signal employs a second type of modulation for orthogonal wireless communication. The first type of modulation employed for the first signal may be non-orthogonal with the second type of modulation employed for the second signal.

In yet at least one further example, wireless communication devices may include a receiver circuit and a processing circuit coupled to the receiver circuit. The processing circuit may be adapted to receive via the receiver circuit a wireless transmission on a particular time and frequency resource, where the wireless transmission includes a first signal from a first wireless device and an underlay second signal from a second wireless device. The first signal may employ an orthogonal frequency division multiplexing (OFDM) modulation, and the underlay second signal may employ a code division multiplexing (CDM) modulation. The processing circuit may be further adapted to decode the first signal and the underlay second signal.

In still further examples, wireless communication devices may include a transmitter circuit and a processing circuit coupled to the transmitter circuit. The processing circuit may be adapted to transmit, via the transmitter circuit, a first signal employing a code division multiplexing (CDM) modulation, where the transmitted first signal is non-orthogonally combined on at least a portion of a particular time and frequency resource with a second signal from a second wireless communication device, the second signal employing an orthogonal frequency division multiplexing (OFDM) modulation.

Additional aspects of the present disclosure include methods operational on wireless communication device and/or means for performing such methods. According to at least one example, such methods may include receiving a wireless transmission including a first signal from a first wireless device utilizing a first type of modulation for orthogonal wireless communication and a second signal from a second wireless device utilizing a second type of modulation that is non-orthogonal to the first type of modulation. Further, both the first signal and the second signal may be decoded.

According to at least one further example, such methods may include encoding data for transmission utilizing a first type of modulation. The data may be transmitted as a first signal utilizing the first type of modulation, where the first signal is transmitted over at least a portion of a time and frequency resource scheduled for a second signal from a second wireless communication device. The second signal may utilize a second type of modulation for orthogonal wireless communication. The first type of modulation employed for the first signal may be non-orthogonal with the second type of modulation employed for the second signal.

Still further aspects of the present disclosure include processor-readable storage mediums storing processor-executable programming. In at least one example, the processor-executable programming may be adapted to cause a processing circuit to receive a wireless transmission including a first signal from a first wireless device on a particular time and frequency resource, the first signal utilizing a first type of modulation for orthogonal wireless communication. The wireless transmission may further include a second signal from a second wireless device on the particular time and frequency resource, the second signal utilizing a second type of modulation that is non-orthogonal to the first type of modulation. The processor-executable programming may further be adapted to cause a processing circuit to decode both the first signal and the second signal.

In at least one additional example, the processor-executable programming may be adapted to cause a processing circuit to encode data for transmission utilizing a first type of modulation. The processor-executable programming may further be adapted to cause a processing circuit to transmit the data as a first signal utilizing the first type of modulation, where the first signal is transmitted over at least a portion of a time and frequency resource scheduled for a second signal from a second wireless communication device. The second signal may utilize a second type of modulation associated with orthogonal wireless communication, and the first type of modulation employed for the first signal may be non-orthogonal with the second type of modulation employed for the second signal.

Other aspects, features, and embodiments associated with the present disclosure will become apparent to those of ordinary skill in the art upon reviewing the following description in conjunction with the accompanying figures.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
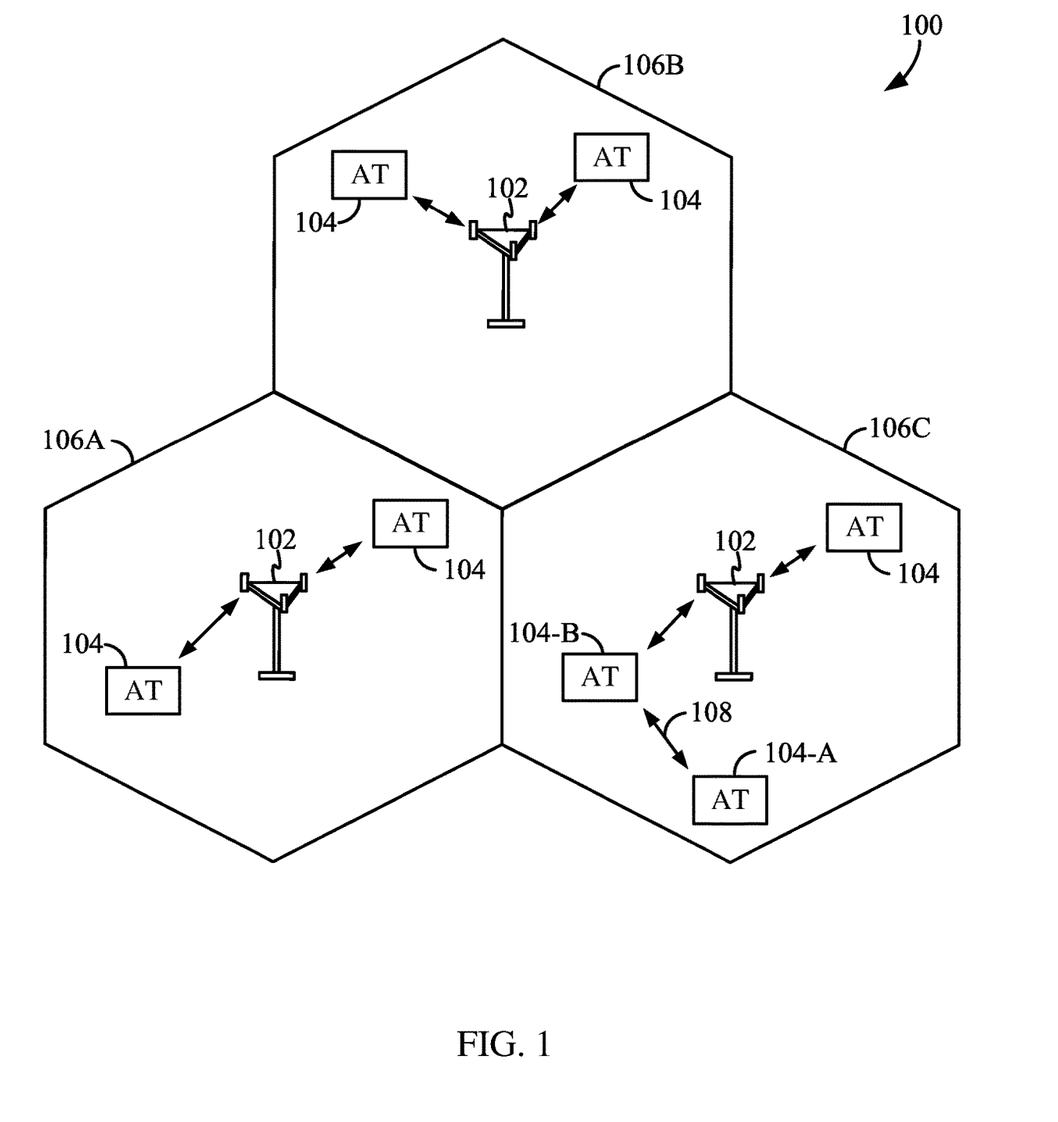
FIG. 1 is a block diagram of a simplified access network depicted according to at least one example.

The various concepts presented throughout this disclosure may be implemented across a broad variety of communication systems, network architectures, and communication standards. Referring to FIG. 1, by way of example and without limitation, a simplified access network 100 is shown. The access network 100 can be implemented according to various network technologies including, without limitation, fifth generation (5G) technology, fourth generation (4G) technology, third generation (3G) technology, and other network architectures. Thus, various aspects of the disclosure may be extended to networks based on Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The wireless communications system 100 is generally adapted to facilitate wireless communication between wireless communications devices, such as one or more base stations 102 and one or more access terminals 104. The base stations 102 and access terminals 104 may be adapted to interact with wireless communications devices through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna, which may also include a plurality of remote antenna units spread across a geographic region. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, an access point, a transceiver function, a basic service set (BSS), an extended service set (ESS), a node B, a femto cell, a pico cell, or some other suitable terminology.

One or more access terminals 104 may be dispersed throughout the coverage areas 106 (e.g., 106A, 106B, 106C). An access terminal 104 may generally include one or more devices that communicate with one or more other devices through wireless signals. For example, an access terminal 104 may communicate with one or more base stations 102 and/or with one or more other access terminals 104. As depicted, the access terminal 104-A may communicate directly with the access terminal 104-B as represented by the wireless communication symbol 108. In various implementations an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, sensor, sensing device, wearable device, router, and/or other communication/computing device which communicates, at least partially, through a wireless or cellular network.

Although the example in FIG. 1 generally depicts an example of a traditional wireless communications system in which access terminals 104 communicate with a network through base stations 102, aspects of the present disclosure may also find application in a variety of other configurations of wireless communications systems. By way of example and not limitation, aspects of the present disclosure may find application in any wireless communication system in which wireless communications occur between two or more wireless devices. Such wireless devices may be any combination of base stations, access terminals, and/or other wireless devices.

In various aspects of the disclosure, wireless communications device may be utilized in a wireless communication network, as a scheduling entity and/or as a non-scheduling or subordinate entity. In any case, the wireless communications device may communicate with one or more wireless entities over an air interface. In any wireless communication network, channel conditions corresponding to the air interface will change over time.

Figure 2:
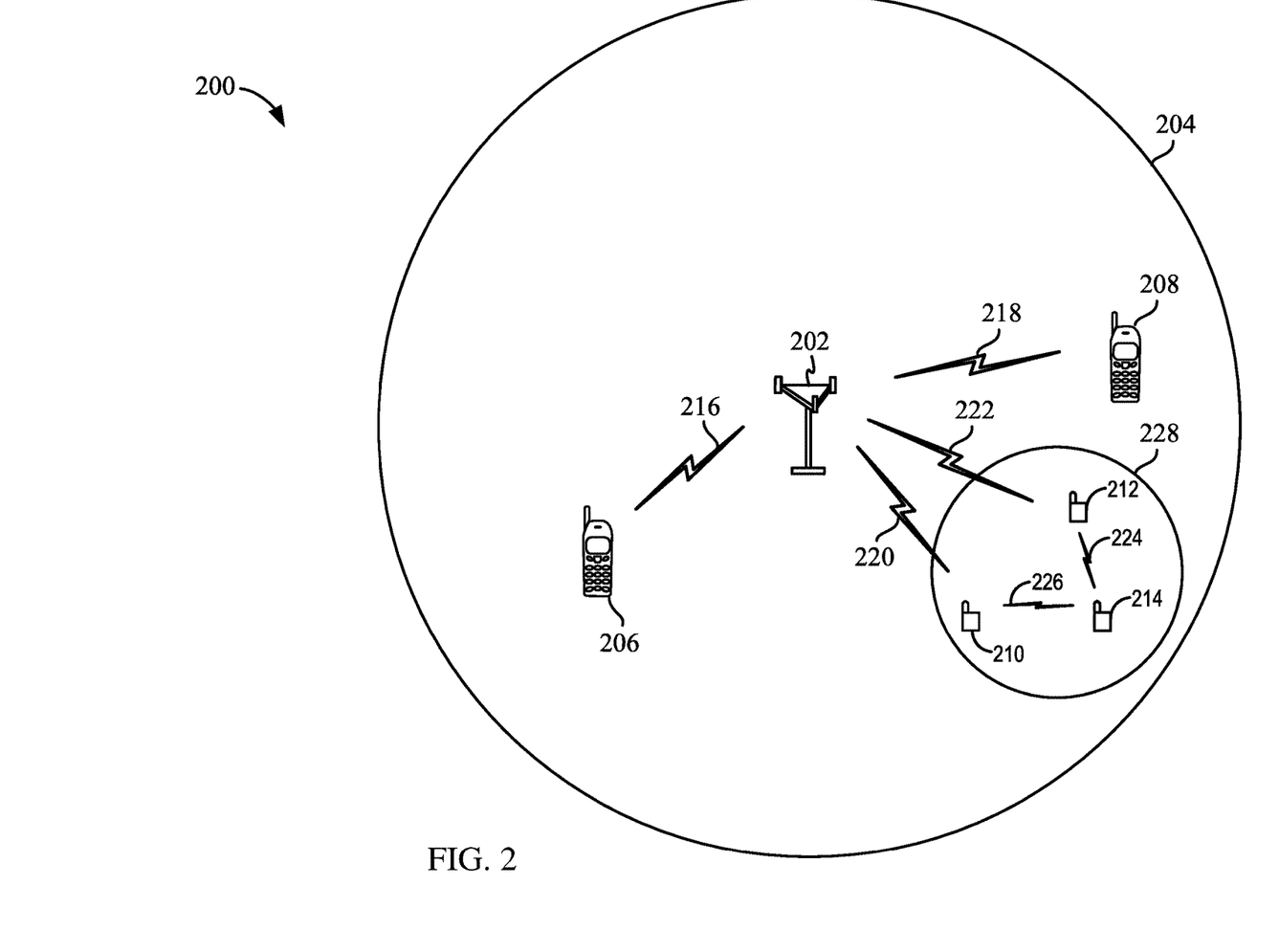
FIG. 2 is a block diagram depicting an environment in which one or more aspects of the present disclosure may find application.

Referring now to FIG. 2, a block diagram of a wireless network environment in which one or more aspects of the present disclosure may find application is illustrated. A wireless communication network 200 may include a base station 202 (e.g., an eNB) that supports wireless WAN service as represented by a coverage area 204. Accordingly, nominal service may be provided for access terminals 206 and 208 as represented, for example, by the wireless communication symbols 216 and 218, respectively.

According to aspects of the present disclosure, the base station 202 may also support underlay service to one or more access terminals, such as access terminals 210, 212, and 214, which underlay service is depicted in FIG. 2 by the wireless communication symbols 220 and 222. In some examples, one or more of the access terminals 210, 212, and 214 may be internet of everything devices. The Internet of everything (TOE) relates, in some aspects, to a variety of devices that can interoperate within the Internet infrastructure. The IOE as applied to wide area networks (WANs) may be referred to as WAN-IOE. A WAN-IOE may involve link budget improvements for extended coverage or for access terminals that do not have power amplifiers. For example, an access terminal without a power amplifier may have a transmit power on the order of 3 dBm. WAN-IOE may involve a planned mesh to supplement direct links at a cell edge (e.g., a cell of a base station). WAN-IOE may involve power saving for small data using asynchronous access and schedule persistence. WAN-IOE may involve higher device capacity e.g., scaling to 50,000 access terminals per cell and beyond. WAN-IOE may involve spectrum and infrastructure re-use through partitioning, underlay, or unlicensed bands.

Some examples of IOE access terminals may include home, commercial, and/or municipal sensors and devices, such as access terminals that report to a WAN directly or through low-power aggregation points and peers, including home appliance connectivity and city infrastructure monitoring and control. Additional examples of IOE access terminals may include tracking, logistics and geo-fencing devices, such as IOE tags employed for tracking with nomadic mobility, longer range, and possibly combined with GPS. Groups of IOE tags may leverage a mesh architecture for power saving, and regions of interest can be based upon aggregator proximity Yet further examples of IOE access terminals include emerging applications, such as wearables and other small form factor devices, scavenging devices, and consumer electronics.

Referring still to FIG. 2, according to aspects of the present disclosure, the time and frequency resources allocated for the underlay service provided to the access terminals 210, 212, and 214 may be non-orthogonal to the time and frequency resources allocated for the nominal service. In some implementations, the access terminals 210, 212, and 214 may form a mesh network as represented by the wireless communication symbols 224 and 226 and the coverage area 228. For example, each of the access terminals 210, 212, and 214 may support device-to-device wireless communication as well as WAN wireless communication.

Figure 3:
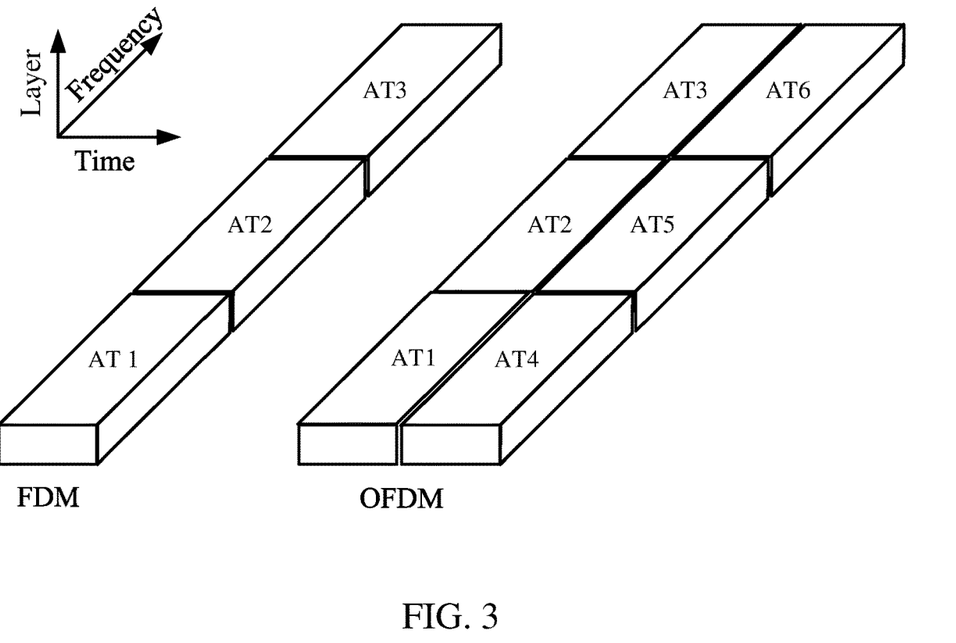
FIG. 3 is a block diagram conceptually illustrating examples of orthogonal multiplexing.
Figure 4:
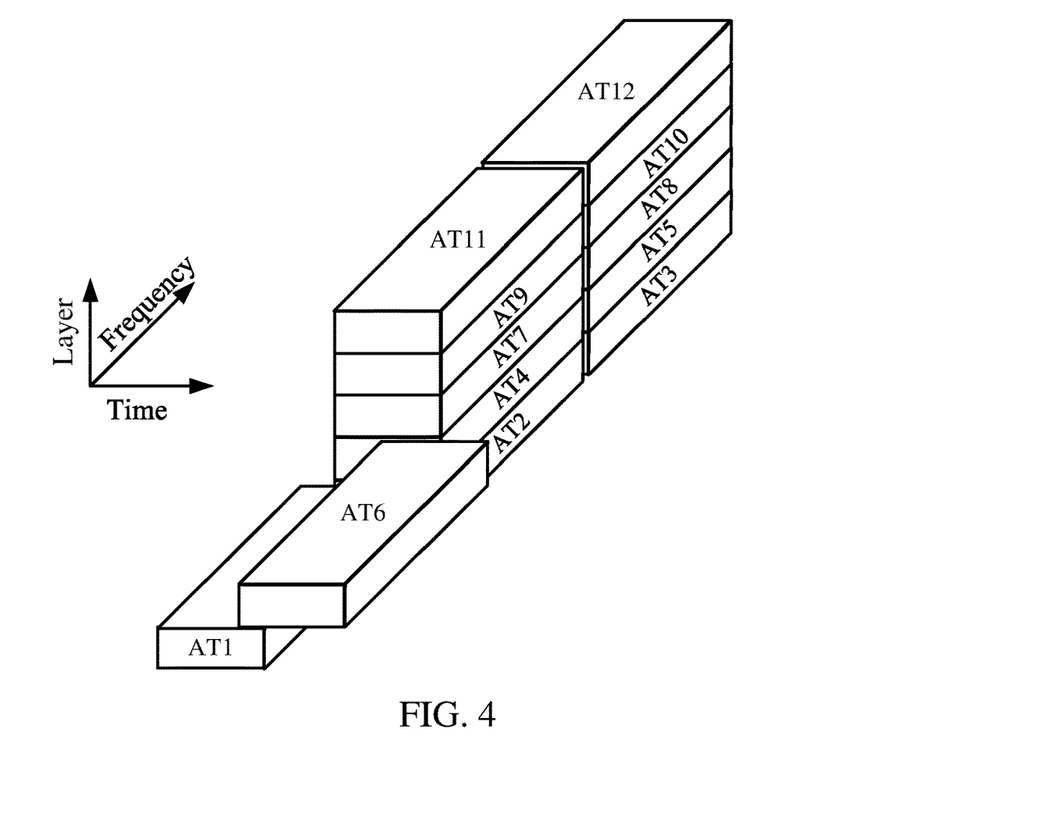
FIG. 4 is a block diagram conceptually illustrating an example of non-orthogonal multiplexing access according to at least one example.

To further explain the differences between aspects of orthogonal and non-orthogonal transmissions, reference is made to FIGS. 3 & 4. FIG. 3 is a block diagram conceptually illustrating examples of orthogonal transmissions, while FIG. 4 is a block diagram conceptually illustrating an example of non-orthogonal transmissions. As shown on the left side in FIG. 3, frequency division multiplexing (FDM) typically allocates a single time and frequency resource to respective transmitting devices where the respective time and frequency resources do not overlap. For example, resources allocated to a first access terminal AT1 and resources allocated to a second access terminal AT2 do not overlap. Further, as shown on the right side in FIG. 3, orthogonal frequency division multiplexing (OFDM) typically allocates a single time and frequency resource block to each respective transmitting device. For example, the various access terminals, AT1 through AT6, are all shown with respectively allocated time and frequency resource blocks. Since the access terminals are orthogonalized, they can be separated through linear processing across time and frequency.

Turning to FIG. 4, it is illustrated that non-orthogonal multiplexing enables multiple access terminals to utilize the same or overlapping time and frequency resources. In other words, at least some access terminals may not be linearly separated across either time, frequency, and/or spatial dimension. As shown, the time and frequency resource blocks overlap. For example, the time and frequency resources allocated to access terminals AT1 and AT6 overlap with each other. Similarly, the time and frequency resource blocks allocated to access terminals AT2, AT4, AT7, AT9 and AT11 overlap, as well as the resource blocks allocated to access terminals AT3, AT5, AT8, AT10, and AT12. As can also be seen, the time and frequency resource blocks allocated between some of the access terminals are still orthogonal. For example, the time and frequency resource blocks allocated between access terminals AT2 and AT3 are still orthogonal. As is also illustrated in FIG. 4, one or more access terminals may be misaligned in time with the other access terminals. For instance, access terminals AT1 and AT6 are shown as being misaligned in the time axis with each other and with the other access terminals As noted previously, aspects of the present disclosure provide an underlay service that enables non-orthogonal multiplexing of the underlay service with the nominal service. In some examples, the non-orthogonal underlay service may be available for uplink transmissions, such as transmissions sent from an access terminal (e.g., access terminal 212 in FIG. 2) to a base station (e.g., base station 202 in FIG. 2), while being unavailable for downlink transmissions. In such examples, the downlink transmissions may include relatively high transmit power that is not conducive to a non-orthogonal underlay. In other examples, the non-orthogonal underlay service may be available for both uplink and downlink transmissions, such as for device-to-device communications between access terminals (e.g., IOE access terminals) where all of the access terminals employ relatively low transmit power. In such examples, the downlink transmissions may come from a scheduling entity to a non-scheduling (or subordinate) entity.

Figure 5:
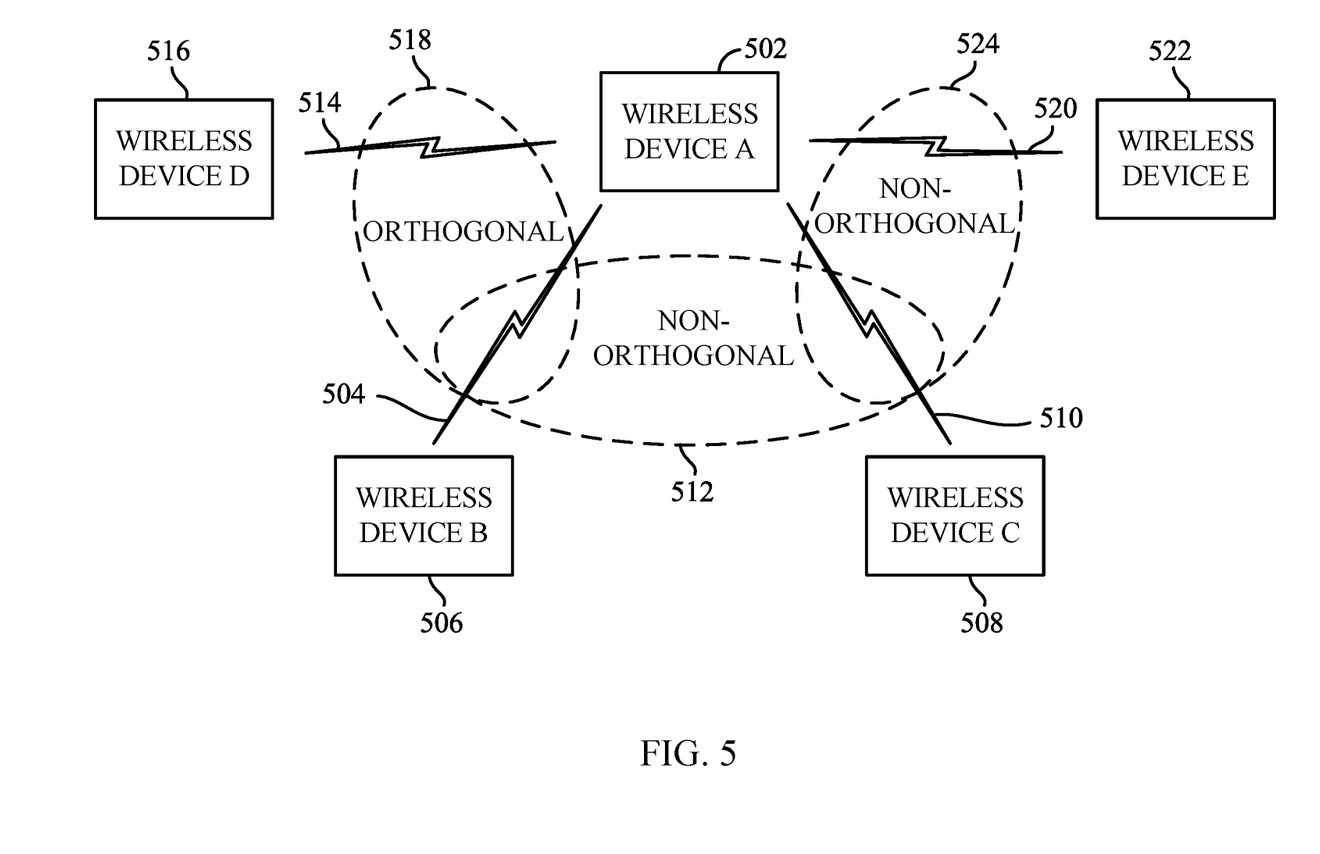
FIG. 5 is a block diagram illustrating wireless communications between wireless communication devices employing orthogonal nominal services and a non-orthogonal underlay service according to at least one example.

FIG. 5 is a block diagram illustrating wireless communications between wireless communication devices employing orthogonal nominal services and a non-orthogonal underlay service according to at least one example. As shown, a first wireless device, wireless device A 502, may send and/or receive wireless transmissions 504 from a second wireless device, wireless device B 506. In this example, the wireless transmissions 504 are sent utilizing the nominal services. A third wireless device, wireless device C 508, also sends and/or receives wireless transmissions 510 with the wireless device A 502. In this example, the wireless transmissions 510 are sent utilizing the underlay services. As indicated by the dashed oval 512, the wireless transmissions 504 with the second wireless device B 506 use at least some of the same time and frequency resources utilized by the wireless transmissions 510 with the third wireless device C 510 in a non-orthogonal manner. That is, the wireless transmissions 510 utilizing the underlay service are non-orthogonal with the wireless transmissions 504 utilizing the nominal service.

As further shown in FIG. 5, additional wireless transmissions 514 may be communicated between the first wireless device A 502 and a fourth wireless device, wireless device D 516. In this example, the wireless transmissions 514 are sent utilizing the nominal services, similar to the wireless transmissions 504. Because the nominal services represent an orthogonal multiplexed service, the wireless transmissions 514 and 504 are orthogonal, as represented by the dashed oval 518.

FIG. 5 also shows further wireless transmissions 520 communicated between the first wireless device A 502 and a fifth wireless device, wireless device E 522. In this example, the wireless transmissions 520 are sent utilizing the underlay services. Because the underlay services utilize non-orthogonal multiplexing, the wireless transmissions 510 and 520 are non-orthogonal to each other, as represented by the dashed oval 524. Furthermore, although not depicted in FIG. 5 the wireless transmissions 520 may also be non-orthogonal multiplexed with the wireless transmissions 504 and 514 communicated utilizing the nominal services.

According to one or more implementations, the transmissions communicated utilizing the underlay services (e.g., wireless transmissions 510) may be sent utilizing a transmit power configured to be less than the transmit power of transmissions utilizing the nominal services (e.g., wireless transmissions 504). For instance, the underlay service transmissions may be configured for a target signal-to-noise ratio (SNR) or signal-to-interference-plus-noise ratio (SINR) that is less than the SNR or SINR for the nominal service transmissions with which the underlay service transmissions are non-orthogonally multiplexed.

In at least some implementations the underlay service transmissions may be longer than the nominal service transmissions with which the underlay service transmissions are non-orthogonally multiplexed. For example, the wireless transmissions 510 may be longer than the wireless transmissions 504. In this manner a receiving wireless device can decode the orthogonal-based nominal service signals, reconstruct them, and then cancel this information from the received signals to decode the non-orthogonal-based underlay service signals.

In some implementations, a wireless device that is transmitting over the non-orthogonal underlay services may obtain an indication that the transmissions will be non-orthogonally multiplexed with a nominal service transmission. In such instances, the wireless device can employ this information when selecting transmission parameters. For example, a wireless device may receive an indication (e.g., from a scheduler such as an eNB or some other device) that the wireless device and another wireless device have been allocated overlapping resources (e.g., one wireless device is using a nominal service and the other is using a non-orthogonal underlay). In this case, as a result of receiving this indication, the wireless device may adapt at least one of transmit power, transmission time, HARQ latency, transmission time interval (TTI) length, HARQ termination, and/or modulation and coding scheme (MCS).

In some implementations, the wireless devices utilizing the non-orthogonal underlay services may be scheduled to facilitate the underlay services deployment. For instance, a wireless device utilizing the nominal services may be scheduled to employ a shorter transmit time and/or a higher power level than another wireless device utilizing the underlay services.

In some implementations, the wireless device that uses the non-orthogonal underlay can be asynchronous to the wireless device that uses the nominal service at a symbol level. In some implementations, the wireless device that use the non-orthogonal underlay can be synchronous to the wireless device that uses the nominal service at a symbol level. In some implementations, the wireless device that uses the non-orthogonal underlay can be asynchronous to the wireless device that uses the nominal service at a TTI level. In some implementations, the wireless device that uses the non-orthogonal underlay can be synchronous to the wireless device that uses the nominal service at a TTI level. If a wireless device receives an indication as to whether it is asynchronous or synchronous to the other wireless device, the wireless device can use different algorithms (e.g., with different numbers of hypotheses) for decoding received data.

In at least one example, the nominal services may employ an orthogonal multiplexing scheme, such as Orthogonal Frequency Division Multiplexing (OFDM). Additionally, the underlay services can employ a non-orthogonal multiplexing scheme, such as a code division multiplexing (CDM). For instance, the wireless transmissions 504 and 514 in FIG. 5 can be communicated utilizing OFDM, and the wireless transmissions 510 and 524 can be communicated utilizing CDM.

Figure 6:
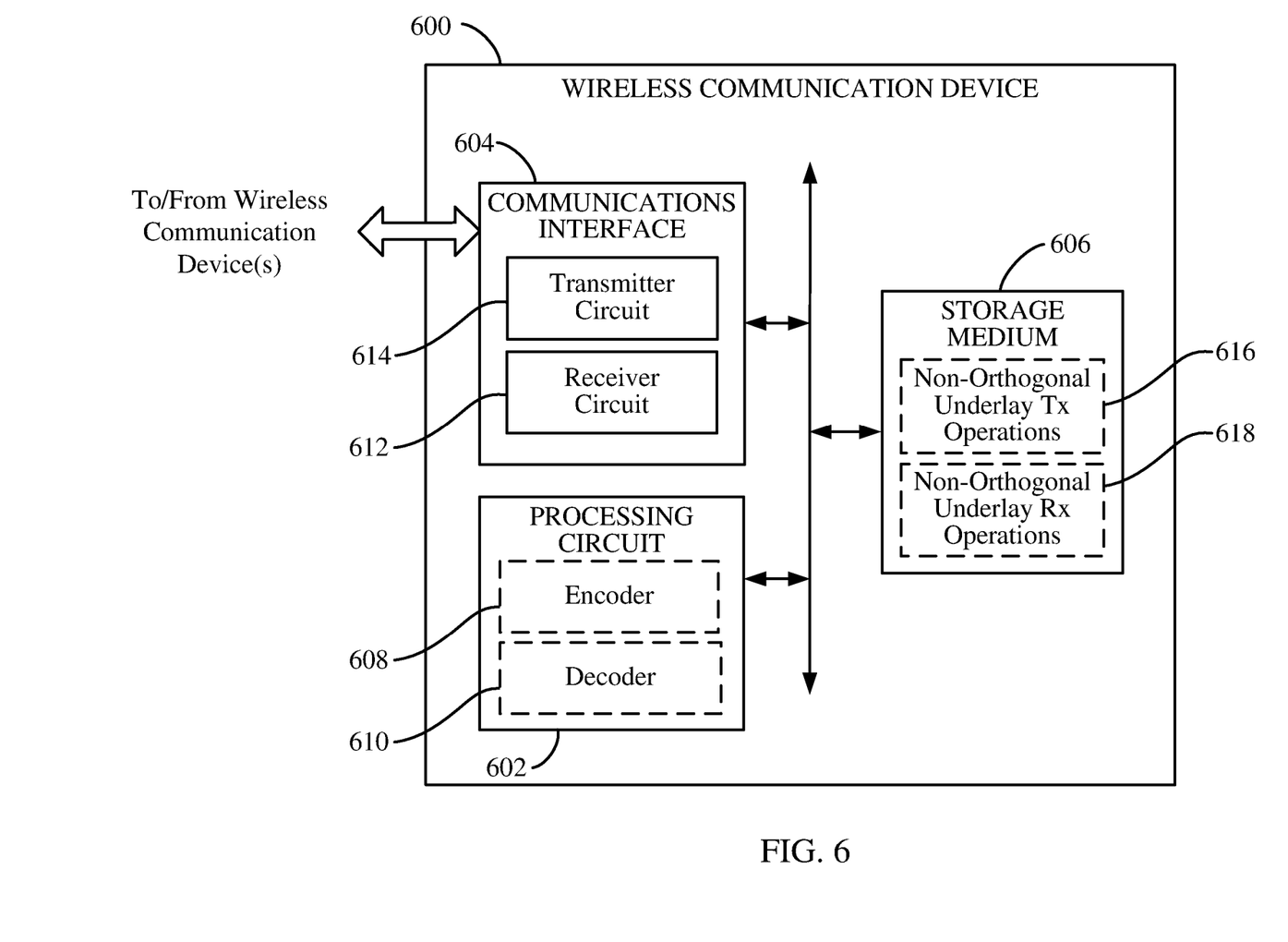
FIG. 6 is a block diagram illustrating select components of a wireless communication device according to at least one example of the present disclosure.

Turning to FIG. 6, a block diagram is shown illustrating select components of a wireless communication device 600 according to at least one example of the present disclosure. According to various implementations of the present disclosure, the wireless communication device 600 may be configured to facilitate uplink and/or downlink non-orthogonal wireless communications utilizing an underlay service. As used in the present disclosure, an uplink transmission refers to any wireless transmission sent by a transmitting wireless communication device to a receiving wireless communication device, where the receiving device is a device that receives and decodes wireless transmissions from multiple transmitting devices. Additionally, a downlink transmission refers to any wireless transmission sent by a transmitting wireless communication device to more than one receiving wireless communication devices, where each of the multiple receiving devices receives and decodes the transmissions from the transmitting device.

The wireless communication device 600 may include a processing circuit 602 coupled to or placed in electrical communication with a communications interface 604 and a storage medium 606.

The processing circuit 602 includes circuitry arranged to obtain, process and/or send data, control data access and storage, issue commands, and control other desired operations. The processing circuit 602 may include circuitry adapted to implement desired programming provided by appropriate media, and/or circuitry adapted to perform one or more functions described in this disclosure. For example, the processing circuit 602 may be implemented as one or more processors, one or more controllers, and/or other structure configured to execute executable programming Examples of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 602 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 602 are for illustration and other suitable configurations within the scope of the present disclosure are also contemplated.

The processing circuit 602 can include circuitry adapted for processing data, including the execution of programming, which may be stored on the storage medium 606. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 602 may include an encoder 608. The encoder 608 may include circuitry and/or programming (e.g., programming stored on the storage medium 606) adapted to encode an amount of data to be transmitted by uplink transmission and/or downlink transmission. In addition or in the alternative, the processing circuit 602 may include a decoder 610. The decoder 610 may include circuitry and/or programming (e.g., programming stored on the storage medium 606) adapted to receive and decode uplink and/or downlink transmissions. In examples where the wireless communication device 600 includes both an encoder 608 and a decoder 610, the two components may be implemented by the same processing circuitry of the processing circuit 602, or as separate processing circuitry of the processing circuit 602.

The communications interface 604 is configured to facilitate wireless communications of the wireless communication device 600. For example, the communications interface 604 may include circuitry and/or programming adapted to facilitate the communication of information bi-directionally with respect to one or more wireless communication devices (e.g., access terminals, network entities). The communications interface 604 may be coupled to one or more antennas (not shown), and includes wireless transceiver circuitry, including at least one receiver circuit 612 (e.g., one or more receiver chains) and/or at least one transmitter circuit 614 (e.g., one or more transmitter chains). The receiver circuit 612 may be electronically coupled to the decoder 610, if present, either directly or indirectly to facilitate the conveyance of orthogonal and/or non-orthogonal transmissions from the receiver circuit 612 to the decoder 610. The transmitter circuit 614 may be electronically coupled to the encoder 608, if present, either directly or indirectly to facilitate the conveyance of encoded data output by the encoder 608 for transmission by the transmitter circuit 614 as part of orthogonal and/or non-orthogonal transmissions.

The storage medium 606 may represent one or more processor-readable devices for storing programming, such as processor executable code or instructions (e.g., software, firmware), electronic data, databases, or other digital information. The storage medium 606 may also be used for storing data that is manipulated by the processing circuit 602 when executing programming. The storage medium 606 may be any available media that can be accessed by a general purpose or special purpose processor, including portable or fixed storage devices, optical storage devices, and various other mediums capable of storing, containing and/or carrying programming By way of example and not limitation, the storage medium 606 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 606 may be coupled to the processing circuit 602 such that the processing circuit 602 can read information from, and write information to, the storage medium 606. That is, the storage medium 606 can be coupled to the processing circuit 602 so that the storage medium 606 is at least accessible by the processing circuit 602, including examples where the storage medium 606 is integral to the processing circuit 602 and/or examples where the storage medium 606 is separate from the processing circuit 602 (e.g., resident in the wireless communication device 600, external to the wireless communication device 600, distributed across multiple entities).

The storage medium 606 may include programming stored thereon. Such programming, when executed by the processing circuit 602, can cause the processing circuit 602 to perform one or more of the various functions and/or process steps described herein. In at least some examples, the storage medium 606 may include non-orthogonal underlay transmission (Tx) operations 616 adapted to cause the processing circuit 602 to send uplink non-orthogonal transmissions and/or downlink non-orthogonal transmissions, as described herein. In addition or in the alternative, the storage medium 606 may include non-orthogonal underlay reception (Rx) operations 618 adapted to cause the processing circuit 602 to receive and decode uplink non-orthogonal transmissions and/or downlink non-orthogonal transmissions, as described herein.

Thus, according to one or more aspects of the present disclosure, the processing circuit 602 is adapted to perform (independently or in conjunction with the storage medium 606) any or all of the processes, functions, steps and/or routines for any or all of the wireless communication devices described herein (e.g., base station 102, access terminal 104, base station 202, access terminal 206, access terminal 208, access terminal 210, access terminal 212, access terminal 214, wireless device A 402, wireless device B 506, wireless device C 508, wireless device D 516, wireless device E 522, wireless communication device 600). As used herein, the term "adapted" in relation to the processing circuit 602 may refer to the processing circuit 602 being one or more of configured, employed, implemented, and/or programmed (e.g., in conjunction with the storage medium 606) to perform a particular process, function, step and/or routine according to various features described herein.

Figure 7:
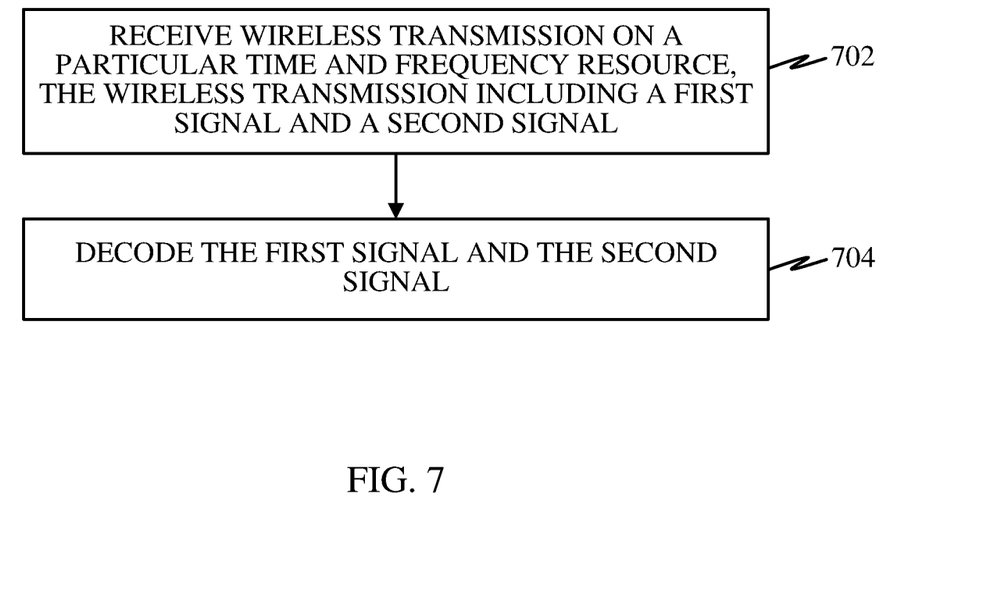
FIG. 7 is a flow diagram illustrating at least one example of a method operational on a wireless communication device for receiving non-orthogonal underlay transmissions.

In operation, a wireless communication device 600 can facilitate wireless communications including data signals transmitted on a non-orthogonal underlay. FIG. 7 is a flow diagram illustrating at least one example of a method operational on a wireless communication device, such as the wireless communication device 600, for receiving non-orthogonal underlay transmissions. Referring to FIGS. 6 and 7, a wireless communication device 600 can receive at operation 702 a wireless transmission on a particular time and frequency resource, where the wireless transmission includes both a first signal and a second signal on at least part of the particular time and frequency resource. For example, the receiver circuit 612 may be adapted to receive the wireless transmission on the particular time and frequency resource, and the processing circuit 602 may be adapted to obtain the wireless transmission via the receiver circuit 612.

The first signal of the wireless transmission can employ a first type of modulation associated with orthogonal wireless communication. The second signal of the wireless transmission that is received on at least part of the same time and frequency resource can employ a second type of modulation associated with non-orthogonal wireless communication. In at least one implementation, the first signal employs orthogonal frequency division multiplexing (OFDM) modulation and the second signal employs code division multiplexing (CDM) modulation. In some implementations, the first signal and the second signal of the wireless transmission may be symbol level synchronous or symbol level asynchronous. In some implementations, the first signal and the second signal of the wireless transmission may be transmission time interval (TTI) level synchronous or TTI level asynchronous.

As noted above with reference to FIG. 5, the first signal can be orthogonal multiplexed with a third signal. For example, the wireless communication device 600 may further receive a third signal via the receiver circuit 612, where the third signal is orthogonal multiplexed with the first signal. For instance, the third signal may also employ OFDM modulation.

In some implementations, the received second signal is longer than the first signal. In some implementations, the received second signal may be configured to use a target signal-to-noise ratio (SNR) or target signal-to-interference-plus-noise ratio (SINR) that is lower than the target SNR or target SINR configured for use by the first signal. In some implementations, the received second signal may include a transmit power and/or MCS selection that is lower than a transmit power and/or MCS selection for the first signal.

At 704, the wireless communication device 600 may decode both the first signal and the second signal. For example, the processing circuit 602 (e.g., the decoder 610) may be adapted obtain the wireless transmission via the receiver circuit 610 and decode the first signal and the second signal from the wireless transmission. In at least one implementation, the processing circuit 602 (e.g., the decoder 610) may be adapted to decode the first signal by treating the second signal as noise while decoding the first signal. After the first signal is reconstructed, the first signal is removed from the received wireless transmission and the second signal is decoded without the first signal. Accordingly, a wireless communication device 600 can receive wireless transmissions including a transmission utilizing an orthogonal nominal service (e.g., the first signal) non-orthogonally combined on a time and frequency resource with a transmission utilizing a non-orthogonal underlay service. The received wireless transmission may be an uplink transmission or a downlink transmission according to different implementations of the method.

Figure 8:
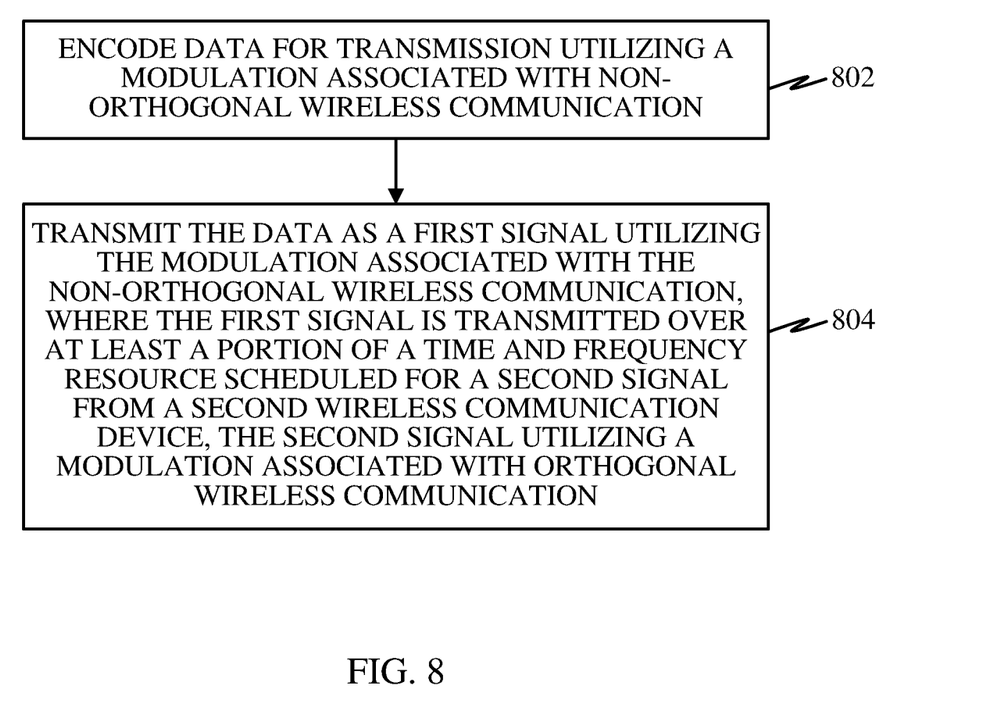
FIG. 8 is a flow diagram illustrating at least one example of a method operational on a wireless communication device for sending non-orthogonal underlay transmissions.

Turning now to FIG. 8, a flow diagram is illustrated depicting at least one example of a method operational on a wireless communication device, such as the wireless communication device 600, for sending non-orthogonal underlay transmissions. Referring to FIGS. 6 and 8, a wireless communication device 600 can encode data for transmission as an underlay communication utilizing a modulation associated with non-orthogonal wireless communication (at operation 802). For example, the processing circuit 602 (e.g., the encoder 608) may be adapted to encode the data stream for transmission as an underlay communication utilizing a modulation associated with non-orthogonal wireless communication. In at least one implementation, the processing circuit 602 (e.g., the encoder 608) may encode the data stream for transmission utilizing CDM modulation.

At 804, the wireless communication device 600 can transmit a first signal utilizing the modulation associated with the non-orthogonal wireless communication over at least a portion of a time and frequency resource scheduled for a second signal from a second wireless communication device. For example, the processing circuit 602 may be adapted to transmit the first signal via the transmitter circuit 614 with the modulation associated with a non-orthogonal underlay (e.g., a CDM modulation), where the first signal is non-orthogonally combined on at least a portion of a particular time and frequency resource with a second signal from a second wireless communication device. The second signal with which the first signal is non-orthogonally combined may utilize a modulation associated with orthogonal wireless communication. For example, the second signal may utilize an OFDM modulation.

In some implementations, prior to encoding the data, the wireless communication device 600 may receive an indication that the first signal will be non-orthogonally combined on a time and frequency resource with the second signal. In some examples, the processing circuit 602 may be adapted to select a particular transmission power, TTI interval, MCS, target SNR, and/or target SINR in response to the received indication.

In some implementations, the transmitted first signal is configured to be longer than the second signal transmitted by the second wireless communication device. For instance, the first signal may be configured to exhibit a decoding timeline that is longer than a decoding timeline for the second signal.

In some implementations, the first signal may be transmitted at a target signal-to-noise ratio (SNR) or target signal-to-interference-plus-noise ratio (SINR) that is lower than the SNR or target SINR configured for use by the second signal. In some implementations, the first signal may be transmitted with a transmit power that is lower than a transmit power associated with the second signal. In some implementations, the first signal may be transmitted according to a MCS selected to be lower than a MCS selected for the second signal.

While the above discussed aspects, arrangements, and embodiments are discussed with specific details and particularity, one or more of the components, steps, features and/or functions illustrated in FIGS. 1, 2, 3, 4, 5, 6, 7, and/or 8 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 5, and/or 6 may be configured to perform or employ one or more of the methods, features, parameters, and/or steps described in FIGS. 3, 4, 7, and/or 8. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
   a receiver circuit adapted to receive a wireless transmission, the wireless transmission including
      a first signal from a first wireless device on a particular time and frequency resource, the first signal transmitted with a first type of modulation for orthogonal wireless communication, and
      a second signal from a second wireless device on the particular time and frequency resource, the second signal transmitted with a second type of modulation that is non-orthogonal to the first type of modulation; and
   a decoder coupled to the receiver circuit to obtain the wireless transmission, the decoder adapted to:
      decode the first signal from the wireless transmission;
      remove the first signal from the wireless transmission to obtain a resulting signal; and
      decode the resulting signal.

2. The wireless communication device of claim 1, wherein:
   the first signal transmitted with orthogonal frequency division multiplexing (OFDM) modulation for the first type of modulation for orthogonal wireless communication; and
   the second signal transmitted with code division multiplexing (CDM) modulation for the second type of modulation that is non-orthogonal to the first type of modulation.

3. The wireless communication device of claim 1, wherein the first and second signals are one of symbol level synchronous or symbol level asynchronous.

4. The wireless communication device of claim 1, wherein the first and second signals are one of transmission time interval (TTI) level synchronous or TTI level asynchronous.

5. The wireless communication device of claim 1, wherein the receiver circuit further receives a third signal from a third wireless device that is orthogonally multiplexed with the first signal.

6. The wireless communication device of claim 1, wherein a transmission power associated with the second signal is less than a transmission power associated with the first signal.

7. The wireless communication device of claim 1, wherein a decoding timeline associated with the second signal is longer than a decoding timeline associated with the first signal.

8. A method operational on a wireless communication device, comprising:
receiving a wireless transmission comprising a first signal from a first wireless device on a particular time and frequency resource, the first signal transmitted with a first type of modulation for orthogonal wireless communication, and a second signal from a second wireless device on the particular time and frequency resource, the second signal transmitted with a second type of modulation that is non-orthogonal to the first type of modulation;
decoding the first signal from the wireless transmission;
removing the first signal from the wireless transmission to obtain a resulting signal; and
decoding the resulting signal.

9. The method of claim 8, wherein:
the first signal transmitted with orthogonal frequency division multiplexing (OFDM) modulation for the first type of modulation for orthogonal wireless communication; and
the second signal transmitted with code division multiplexing (CDM) modulation for the second type of modulation that is non-orthogonal to the first type of modulation.

10. The method of claim 8, wherein the first and second signals are one of symbol level synchronous or symbol level asynchronous.

11. The method of claim 8, wherein the first and second signals are one of transmission time interval (TTI) level synchronous or TTI level asynchronous.

12. The method of claim 8, further comprising: receiving a third signal from a third wireless device, the third signal transmitted with the first type of modulation and being orthogonally multiplexed with the first signal.

13. The method of claim 8, wherein a transmission power associated with the second signal is less than a transmission power associated with the first signal.

14. A wireless communication device, comprising:
means for receiving a wireless transmission comprising a first signal from a first wireless device on a particular time and frequency resource, the first signal transmitted with a first type of modulation for orthogonal wireless communication, and a second signal from a second wireless device on the particular time and frequency resource, the second signal transmitted with a second type of modulation that is non-orthogonal to the first type of modulation; and
means for decoding the first signal and the second signal, wherein the means for decoding the first signal and the second signal comprises:
means for decoding the first signal from the wireless transmission;
means for removing the first signal from the wireless transmission to obtain a resulting signal; and
means for decoding the resulting signal.

15. The wireless communication device of claim 14, wherein:
the first signal transmitted with orthogonal frequency division multiplexing (OFDM) modulation for the first type of modulation for orthogonal wireless communication; and
the second signal transmitted with code division multiplexing (CDM) modulation for the second type of modulation that is non-orthogonal to the first type of modulation.

16. The wireless communication device of claim 14, wherein the second signal is configured to be longer in duration than the first signal.

17. The wireless communication device of claim 14, wherein a transmission power associated with the second signal is less than a transmission power associated with the first signal.

18. A non-transitory processor-readable storage medium storing processor-executable programming for causing a processing circuit to:
receive a wireless transmission comprising a first signal from a first wireless device on a particular time and frequency resource, the first signal transmitted with a first type of modulation for orthogonal wireless communication, and a second signal from a second wireless device on the particular time and frequency resource, the second signal transmitted with a second type of modulation that is non-orthogonal to the first type of modulation;
decode the first signal from the wireless transmission;
remove the first signal from the wireless transmission to obtain a resulting signal; and
decode the resulting signal.

19. The non-transitory processor-readable storage medium of claim 18, wherein:
the first signal transmitted with orthogonal frequency division multiplexing (OFDM) modulation for the first type of modulation for orthogonal wireless communication; and
the second signal transmitted with code division multiplexing (CDM) modulation for the second type of modulation that is non-orthogonal to the first type of modulation.

20. The non-transitory processor-readable storage medium of claim 18, wherein a decoding timeline associated with the second signal is longer than a decoding timeline associated with the first signal.

21. A wireless communication device, comprising:
a receiver circuit; and
a processing circuit coupled to the receiver circuit, the processing circuit adapted to
receive via the receiver circuit a wireless transmission on a particular time and frequency resource, the wireless transmission comprising a first signal from a first wireless device and an underlay second signal from a second wireless device, wherein the first signal is transmitted with an orthogonal frequency division multiplexing (OFDM) modulation, and the underlay second signal is transmitted with a code division multiplexing (CDM) modulation,
decode the first signal from the wireless transmission;
remove the first signal from the wireless transmission to obtain a resulting signal;
and
decode the resulting signal.

* * * * *

UNITED STATES PATENT AND TRADEMARK OFFICE
CERTIFICATE OF CORRECTION

PATENT NO. : 11,108,493 B2
APPLICATION NO. : 16/521465
DATED : August 31, 2021
INVENTOR(S) : Tingfang Ji et al.

It is certified that error appears in the above-identified patent and that said Letters Patent is hereby corrected as shown below:

In the Specification

Column 5, Line 58, "(TOE)" should be --(IOE)--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*